United States Patent [19]

Mazac

[11] Patent Number: 4,714,818
[45] Date of Patent: Dec. 22, 1987

[54] MAGNETIC CONTROL DEVICE FOR ARC WELDING

[75] Inventor: Karel Mazac, Friedberg, Fed. Rep. of Germany

[73] Assignee: Kuku Schweissanlagen and Roboter GmbH, Augsburg, Fed. Rep. of Germany

[21] Appl. No.: 876,887

[22] PCT Filed: Oct. 1, 1985

[86] PCT No.: PCT/EP85/00506
§ 371 Date: Jul. 10, 1986
§ 102(e) Date: Jul. 10, 1986

[87] PCT Pub. No.: WO86/02028
PCT Pub. Date: Apr. 10, 1986

[30] Foreign Application Priority Data

Oct. 5, 1984 [DE] Fed. Rep. of Germany ....... 3436633

[51] Int. Cl.⁴ .............................................. B23K 9/08
[52] U.S. Cl. .................................................. 219/123
[58] Field of Search ................................ 219/123, 136

[56] References Cited

U.S. PATENT DOCUMENTS 4,278,868 7/1981 Rudd et al. .......................... 219/123
4,436,980 3/1984 Pache et al. .......................... 219/123

FOREIGN PATENT DOCUMENTS 0040673 3/1981 European Pat. Off. .
2258417 6/1974 Fed. Rep. of Germany .
1600894 10/1981 United Kingdom .

*Primary Examiner*—Clifford C. Shaw
*Attorney, Agent, or Firm*—Karl F. Ross; Herbert Dubno

[57] ABSTRACT

The invention relates to a device for welding of metallic parts with tubular cross section with an electric arc, having at least two magnets with the same polarity, surrounding the weld seam line annularly with their pole faces. In such a welding device, the pole faces are easily contaminated with weld splashes, during welding. Such contamination has a negative influence on the electric arc path and the weld seam line is deteriorated. In order to avoid such contamination, the invention proposes that the pole faces (4) be provided each with a covering protection ring (5), presenting an inner surface (7) inclined towards the weld seam line.

6 Claims, 3 Drawing Figures

MAGNETIC CONTROL DEVICE FOR ARC WELDING

CROSS-REFERENCE TO RELATED APPLICATIONS

This application is a National Phase application corresponding to the international application PCT/EP85/00506 filed Oct. 1, 1985 and based, under the International Convention, upon a German National application No. P34 36 633.4 of Oct. 5, 1984.

FIELD OF THE INVENTION

The invention relates to a device for welding metallic parts with tubular cross section with an electric arc moved magnetically along a closed weld seam line, lying in one plane, having at least two magnets with the same polarity surrounding the seam line annularly, with their pole surfaces.

BACKGROUND OF THE INVENTION

Such magnets with their respective wheel pieces are utilized to control the arc generated between two workpieces which are welded together along an annular weld seam. These magnets are arranged, as a rule, radially with respect to the weld seam line, as for instance, in the arrangement according to German Pat. No. 30 18 199, (see U.S. Pat. No. 4,436,980). Their respective magnetic cores, each carrying a coil, have on each of their ends facing the seam line a curved recess, following the course of the seam line by covering the same almost completely, and bearing the pole faces.

In such devices for the magnetic arc welding, the pole faces form a cylindrical surface surrounding the weld seam. The shape of the cross section of this cylindrical surface corresponds to the weld seam line, which means to the outer cross section of the part to be welded, for instance, rings, tubes, caps, sockets, or other such various cross sections or various geometrical shapes. The shape of the cross section does not necessarily have to be circular. The axis of the cylindrical surface runs parallel to the axis of the part of the welded, respectively, can be identical therewith.

The disadvantage of welding with such devices however, is the contamination of the pole surfaces by weld splashes, which exert a negative influence on the arc path, result in irregular weld seams and create problems with the coil insulation. The pole faces have therefore to be cleaned constantly, at short intervals. In the case of partially or fully automated welding machines of this kind, an additional device for the removal of weld splashes is therefore required, usually a brushing system.

OBJECT OF THE INVENTION

The invention has the object to avoid these disadvantages and to prevent the contamination of the pole surfaces by weld splashes, so that no more splashes would accumulate in the welding area and disturb the welding process and that the space between the coil and the centering clamp would remain free of splashes.

SUMMARY OF THE INVENTION

The solution of this problem according to the invention consists in the fact that the pole faces are provided with a covering protection ring, having an inner surface surrounding the weld seam line, this surface being inclined towards the weld line. The protective ring is bevelled towards the part to be welded and adjusted to the shape thereof. In the case of parts with circular cross section, (for instance pipes), also in the case of circular weld lines, the inner surface of the ring is a part of a conical surface, wherein the axis of the cone and the axis of the part to be welded coincide. If, during welding, drops fall onto the inner ring surface, they are deflected towards the exterior due to the inclination of this surface according to the invention. Thus, the inclined inner surface of the protection ring serves as a repelling surface for the weld drops. Preferably, copper is used as material for the protection rings. Other materials, such as ceramic and metals can also be used, as far as they do not influence negatively the magnetic field. An efficient cooling is advantageous. Within the teaching of the invention, an inclination of the inner ring surface with respect to the axis of the part to be welded of approximately 50° and more has proven to be particularly advantageous. The angle, respectively the inclination is influenced by the shape of the construction part and the configuration of the coil. Since, as a rule, the welding apparatus has always two or more magnets, radially arranged within the area of the part to be welded, which surround the parts to be welded, respectively the weld seam line, with their recesses forming the pole faces arrayed in the known manner as segments of a circle or in another kind of closed curve, it is recommended, in order to simplify the assembly, that the protecting ring be subdivided in individual segments, corresponding to the number of magnets, which are then mounted to the pole faces of the individual magnets.

Due to the inclination of the protection ring, this comes especially close to the part to be welded at one side of its inner surface, so that only a very narrow gap is left between the ring and the part. This gap is very well suited for the supply of a protective gas. This gas can be introduced, for instance, coming from one side via a duct, through the gap to the location of the weld.

BRIEF DESCRIPTION OF THE DRAWING

The invention is illustrated in the drawing, schematically and as an example. In the drawing

SPECIFIC DESCRIPTION

Figure 1:
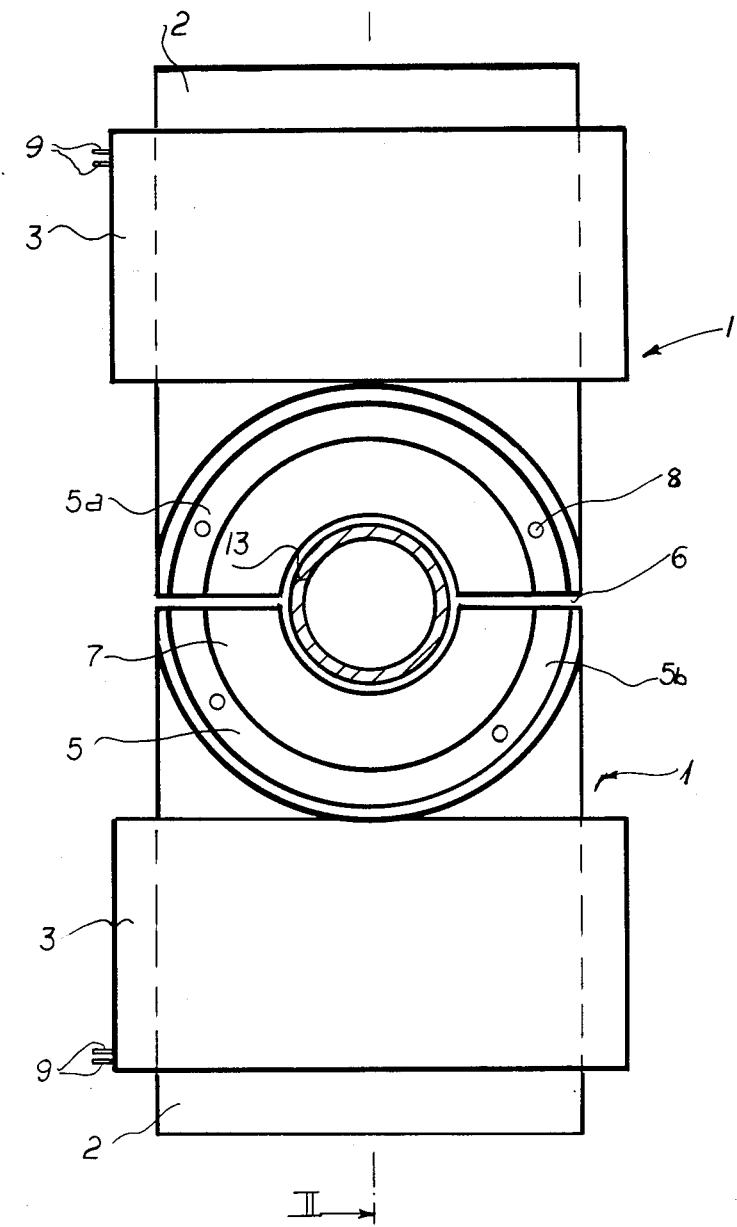
FIG. 1 is an elevational view of an embodiment with an arrangement of two magnets.
Figure 2:
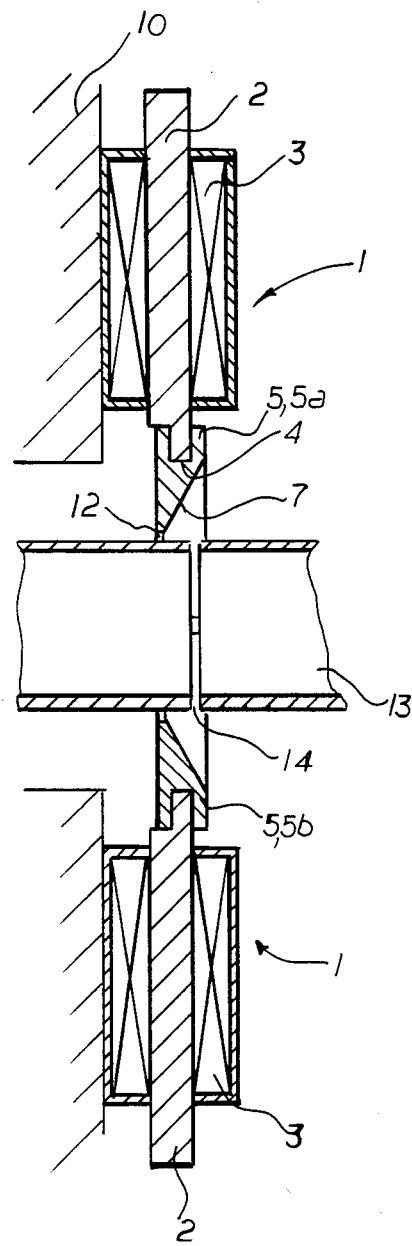
FIG. 2 is a sectional view of the embodiment according to FIG. 1, along the line II—II.

In the arrangement according to FIGS. 1 and 2, a welding apparatus with two electromagnets 1 is shown, each of them consisting in the known manner of a magnetic core 2 carrying a coil 3. These cores surround the weld seam line with their respective semi-circular recesses in a known manner, respectively the parts to be welded which here are tubes with a circular cross section, so that only a narrow air gap 6 remains at the sides opposite the circular seam line.

The cores 2, as can be seen from the cross section in FIG. 2, are stepped down in the area of the recess in the case of the here represented embodiment, so that only a narrow pole face 4 results, which surrounds the seam line cylindrically. In both magnet cores 2 extending over the entire recess, on each of the pole faces one half of a protection ring 5 is attached, having an inner surface 7 inclined towards the axis of the part to be welded. From this inner surface 7, (which due to the circular shape of the weld seam is conical), the radially outwardly flying weld splashes are deflected towards the exterior. In the shown embodiment, fastening means 8, passing through the ring and the core are used for the attachment of the protection ring 5. Electrical connection wires for the coil 3 are marked with the numeral 9. A portion of the welding apparatus where the magnets 1 are attached, is marked with the numeral 10.

Figure 3:
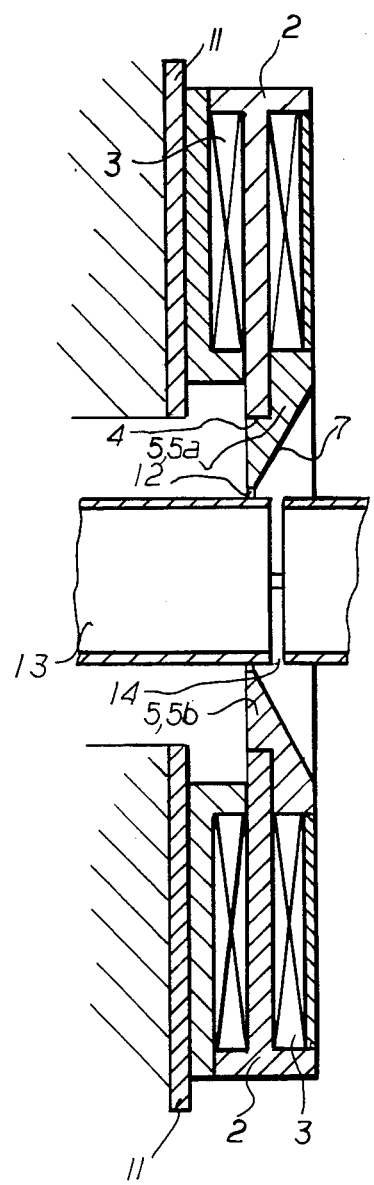
FIG. 3 is a sectional view of a variant to the arrangement shown in FIGS. 1 and 2.

In the embodiment of FIG. 3, the individual magnet 1, consisting of the core 2 and the coil 3, is attached to the machine via the insulation 11. Due to the inclination of the inner surface 7 of the ring, between the protection ring 5 and the pipe 13 to be welded, a very narrow gap 12 surrounding the pipe 13 in the immediate vicinity of the weld location 14, results, through which protection gas can be fed in a particularly evenly distributed way.

In the represented example with only two magnets 1, which is generally the simplest embodiment, the protection ring 5 is subdivided into two segments—5a and 5b—which correspond here exactly to one half of the ring. In arrangements with more than two magnets, the protection ring 5 can be subdivided into several segments, corresponding to the number of magnets and to the arc length of its pole shoe.

I claim:

1. A device for the electric arc welding of two annular workpieces along an endless annular weld seam path lying in a plane, said device comprising:

at least two radially extending flat unipolar magnet cores lying generally in said plane of said path and surrounding said seam path with narrow pole faces of said cores;

a respective coil on each of said cores;

a protection ring in addition to said cores subdivided into individual segments each of which is attached to a respective pole face of a respective one of said cores, each segment of said protection ring having a segment of a frustoconical inner surface of said ring surrounding said weld seam path so that an axis of said frustoconical inner surface and an axis of said workpieces to be welded coincide, said inner surface of said protection ring including an angle with said axes of at least 50°, the thickness of said segments of said ring being greater than the width of said pole faces where said segments of said ring are attached to the cores; and fastening means passing through said segments of said ring and the respective cores for fastening each of said segments of said ring to the respective core.

2. The device defined in claim 1 wherein the segments of said protection ring have recesses receiving said faces of said magnet cores.

3. The device defined in claim 1 wherein a gap is defined between said protection ring and the workpieces to be welded.

4. The device defined in claim 2 wherein said recesses have a rectangular cross sectional shape opening outwardly and said pole faces of said magnet cores are received in said recesses.

5. The device defined in claim 2 wherein each pole face and the respective said recess form a rabbet joint.

6. The device defined in claim 1, further comprising a layer of insulation attaching each of said cores to a support.

* * * * *